Patented Dec. 10, 1929

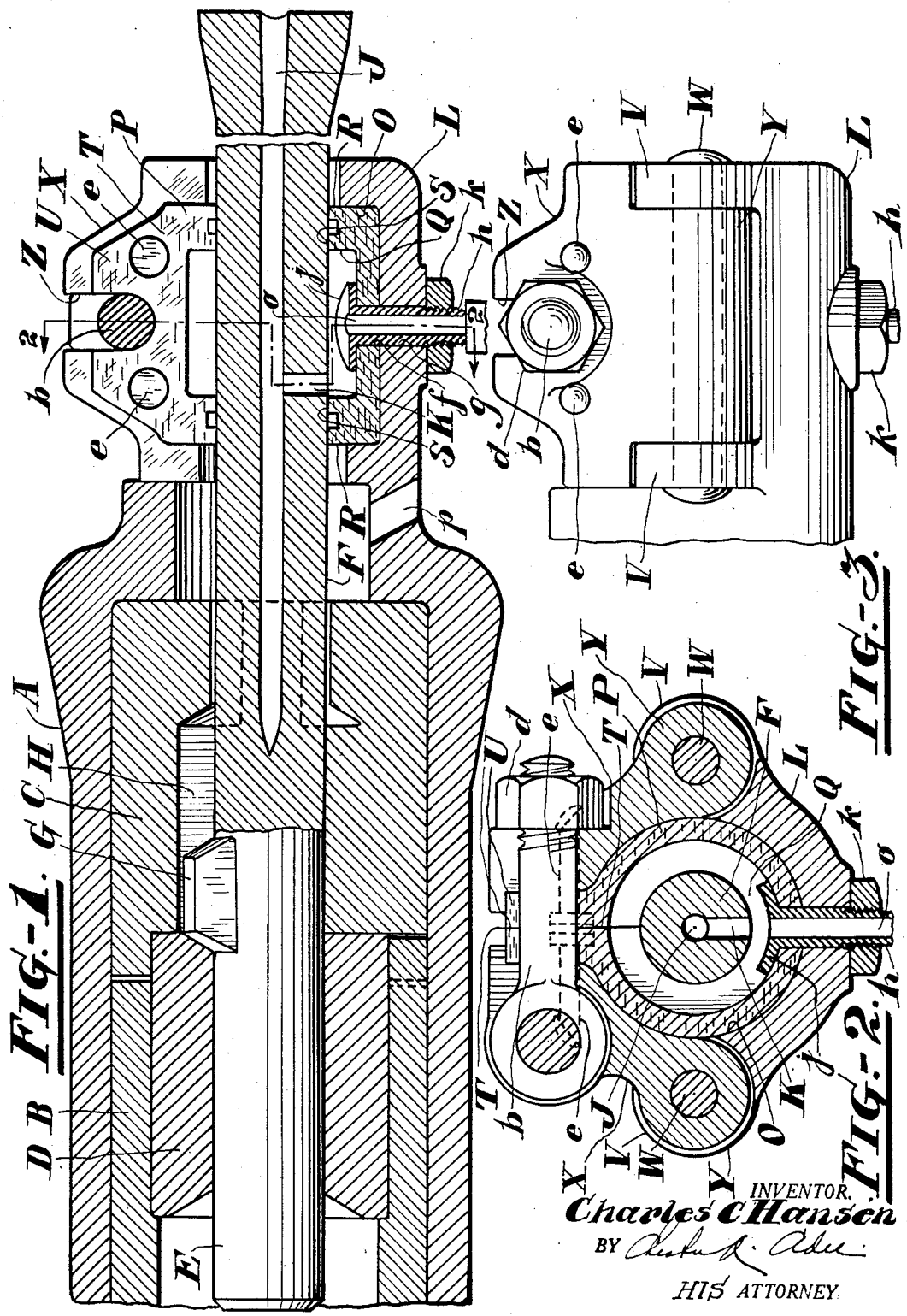

1,739,141

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

LIQUID-FEEDING DEVICE FOR ROCK DRILLS

Application filed September 18, 1928. Serial No. 306,738.

This invention relates to rock drills, but more particularly to a fluid feeding device for fluid actuated rock drills of the hammer type.

The objects of the invention are to eliminate the chances of leakage of pressure fluid from the rock drill through the working implement into the drill hole, to assure an abundant supply of cleansing liquid to the drill hole and, to assure against the leakage of cleansing liquid into the percussive element of the rock drill.

Other objects will be in part obvious and in part pointed out hereinafter.

In the drawings illustrating the invention and in which similar reference characters refer to similar parts—

Figure 1 is a longitudinal sectional view of the front end of a rock drill equipped with a fluid feeding device constructed in accordance with the practice of the invention;

Figure 2 is a transverse view taken through Figure 1 on the line 2—2 looking in the direction indicated by the arrows, and Figure 3 is a longitudinal side elevation of the fluid feeding device.

Referring to the drawings, A denotes a front head in which is disposed chuck mechanism comprising a chuck B and a chuck jaw C which may be interlocked with the chuck B in a well known manner. A chuck bushing D is disposed in the chuck B to receive slidably the shank E of a working implement F, such as a drill steel.

The drill steel F in this instance is provided with a single lug G to interlock with a rib H in the chuck jaw C for transmitting the rotation of the chuck mechanism to the drill steel. The rearward end or shank E of the drill steel F in this instance is of the solid type and in the body portion of the drill steel forwardly of the lug G is formed a longitudinal passage J for conveying cleansing liquid such as water into the hole being drilled. Near the rearward end of the passage J is a radial passage K which leads to the surface of the drill steel F for conveying cleansing liquid into the passage J.

A well known method of introducing cleansing liquid into the drill hole is to equip the rock drill with a water tube. Such water tube usually extends entirely through the drill and with its front end into the working implement. In such case of course the working implement or drill steel F is hollow throughout its length. While this method has proved satisfactory in most respects there are instances however, in which it is objectionable owing to an injector effect created by this mode of introducing cleansing liquid into the drill steel and whereby air is drawn into the drill hole. Moreover, any pressure fluid leaking past or through the percussive element of the drill may readily flow through the drill steel into the drill hole from whence it issues in the form of bubbles carrying with it dry cuttings or dust which circulates in the vicinity of the drilling operation and is inhaled by the operator, frequently to the detriment of his health.

The present invention contemplates the preclusion of pressure fluid or air bubbles from the drill hole and consequently the presence of dust in the vicinity of the drilling operation. To this end the front head A is provided with an extension L at its front end. The extension L may be in transverse section of semi-circular form and has a recess O for the reception of a flexible sleeve P which may be of rubber or other suitable flexible material. The flexible sleeve P has a recess Q which forms a chamber for water around the drill steel F and adjacent the passage K, the recess Q being of such length that the passage K will at all times be in communication therewith. In order to assure against leakage of water from the recess Q the sleeve P is provided at its ends with integral flanges R having bores S through which the drill steel extends. The bores S are preferably of slightly smaller diameter than the diameter of the drill steel so that the flanges may tightly engage the drill steel to form fluid tight joints therebetween.

In order to enable the lug G of the drill steel F to readily pass through the sleeve P said sleeve is longitudinally split as at T to allow the sleeve to be opened. The sleeve P is provided on opposite sides of the cut or split T with lateral extensions or wings U which, when the steel is closed, will lie in face to face relationship for sealing the sleeve at this point.

The extension L is provided at its open side with lugs V to which may be pivoted, as by means of pins W, plates X which have integral lugs Y through which the pins W also extend. The plates X may be of the same conformation and in this instance are provided with slots Z for the reception of a bolt b having a nut d whereby the plates and thus also the wings U may be firmly clamped together. Preferably the wings U are secured to the plates X and to this end rivets e are employed for fastening the wings U to the plates so that when the plates X are opened the wings U will open therewith.

Additional means may be used for securing the sleeve P in the operative position. In the present instance the sleeve P and the extension L are provided with aligned bores f and g respectively for the reception of a connection h which has a flange j at its innermost end to lie against the wall of the recess Q. The outer portion of the connection h is threaded to receive a nut k whereby the said connection may be clamped securely to the extension L.

The connection h is provided with a passage o through which water from a suitable source of supply may be introduced into the recess Q. Preferably a port p is formed in the front end of the front head A between the chuck jaw C and the extension L to provide an escape for any pressure fluid which may find its way to the front end of the drill.

The mode of operation of the device is as follows: Whenever it is desired to insert a drill steel F in the front head A the plates X may be opened to permit the passage of the lug G therethrough into the chuck mechanism. After the drill steel F has been properly inserted the plates X and the sleeve P may be closed and firmly clamped together by means of the bolt b and the nut d. The device will then be in readiness for supplying water to the drill steel and an effective seal may be obtained against leakage of water from the chamber.

I claim:

1. In a fluid actuated rock drill, the combination of a front head and a drill steel having a passage, a lug on the drill steel, an extension on the front head through which the drill steel extends and having an open side to permit the passage of the lug through the extension, means secured to the extension to form a closure therefor, and a flexible sleeve in the extension forming a chamber for cleansing liquid around the drill steel adjacent the inlet opening of the passage and having integral flanges at its ends in fluid tight engagement with the drill steel, and means secured to the extension for conveying cleansing liquid into the sleeve.

2. In a fluid actuated rock drill, the combination of a front head and a drill steel having a passage, a lug on the drill steel, an extension integral with the front head through which the drill steel extends and having an open side to permit the passage of the lug through the extension, means pivotally secured to the extension to form a closure for the open side, a flexible sleeve in the extension forming a chamber for cleansing liquid adjacent the inlet opening of the passage and having flanges in fluid tight engagement with the drill steel, said sleeve being longitudinally split to enable said sleeve to open with the said means, and a connection secured to the extension for clamping the sleeve to the extension and for conveying cleansing liquid into the sleeve.

3. In a fluid actuated rock drill, the combination of a front head and a drill steel having a passage, a lug on the drill steel, an extension integral with the front head through which the drill steel extends and having an open side to permit the passage of the lug through the extension, a plate pivotally secured to the extension to form a closure for the open side, a flexible sleeve in the extension and the plate forming a chamber for cleansing liquid adjacent the inlet opening of the passage and having end flanges in fluid tight engagement with the drill steel to prevent leakage of liquid from the chamber, said sleeve being longitudinally split to enable said sleeve to be opened to permit the passage of the lug therethrough, wings on the sleeve adapted to be held in fluid tight relationship by the plate, and a connection secured to the extension for conveying cleansing liquid into the sleeve.

4. In a fluid actuated rock drill, the combination of a front head and a drill steel having a passage, a lug on the drill steel, an extension integral with the front head through which the drill steel extends and having an open side to permit the passage of the lug through the extension, a pair of plates secured pivotally to the extension to form a closure for the open side, a flexible sleeve in the extension and the plates forming a chamber around the drill steel for cleansing liquid adjacent the inlet opening of the passage and having integral flanges at its ends in fluid tight engagement with the drill steel to prevent leakage of water from the chamber, said sleeve being longitudinally split and having wings extending between the plates, means for securing the wings to the plates to assure opening of the sleeve with the plates, means for holding the plates securely in closed position and for holding the wings in fluid tight relationship, and a connection secured to the extension for conveying cleansing liquid into the sleeve.

In testimony whereof I have signed this specification.

CHARLES C. HANSEN.